United States Patent
Wise

[11] Patent Number: 6,115,953
[45] Date of Patent: Sep. 12, 2000

[54] PHOTO-REPRODUCED ANIMAL DECOY

[75] Inventor: Darrel Wise, Selah, Wash.

[73] Assignee: Webfoot Outfitters, Yakima, Wash.

[21] Appl. No.: 09/197,109

[22] Filed: Nov. 20, 1998

[51] Int. Cl.[7] .................................................. A01M 31/06
[52] U.S. Cl. ........................................ 43/2; 43/3; 40/615
[58] Field of Search ................................. 43/2, 3; 40/615

[56] References Cited

U.S. PATENT DOCUMENTS

| 430,565 | 6/1890 | Curlin . | |
|---|---|---|---|
| 3,245,168 | 4/1966 | Pool | 43/3 |
| 3,707,798 | 1/1973 | Tryon | 43/3 |
| 5,003,718 | 4/1991 | Lenert et al. | 43/3 |
| 5,293,709 | 3/1994 | Cripe | 43/3 |

Primary Examiner—Jack W. Lavinder
Attorney, Agent, or Firm—Stratton Ballew PLLC

[57] ABSTRACT

A process and apparatus for an animal decoy and specifically a goose decoy are provided. The decoy includes a body with a body surface. An image substrate is applied to the body surface, and the image substrate includes a fabric material. A decoy image is printed upon the fabric image substrate. The animal decoy of is a photo-reproduced image, based upon a photograph of an actual animal. The image substrate can include a bonding surface. The bonding surface adheres to the body surface. The first substrate includes a bonding surrface that can include an elastomeric coating, for bonding to the decoy body. An adhesive is utilized to laminate the fabric substrate to the decoy body, and an image is then applied to the fabric substrate.

12 Claims, 2 Drawing Sheets

PHOTO-REPRODUCED ANIMAL DECOY

TECHNICAL FIELD

The invention relates to a process and apparatus for a decoy, and more particularly to a process for applying a photo-reproduced image to the body of an animal decoy, and especially a bird decoy, such as a goose.

BACKGROUND OF THE INVENTION

It is well established that silhouette decoys for game birds are effective and desirable alternatives to three dimensional, or "full-body" decoys, especially for game birds such as wild geese. The flat silhouettes are easily stored, transported and deployed, and in most instances less expensive to produce. Importantly for bird hunters, flat silhouette decoys are considered just as effective in luring the desired prey as a realistically rendered full-body decoy.

U.S. Pat. No. 3,707,798 to Tryon discloses a silhouette goose decoy having a color "photo-reproduced" image of an actual goose on the decoy. A common and difficult problem for flat decoys is "flashing." Flashing occurs when the sun reflects off of the surface of the decoy. As soon as a bird observes the bright and unnatural flashing of the decoy, the bird is alerted to the strangeness of the decoy and will be repelled from it instead of attracted to it. Tryon '798 employs a color photographic technique to apply the image to the decoy. However, Tryon '798 fails to address the problem of sunlight flashing off the flat photographic image on the decoy.

Several flat decoys have been manufactured that include measures intended to reduce flashing. U.S. Pat. No. 4,845,827 to Anderson employs a rough fiber and resin board in a silhouette goose decoy to achieve a "non-glare surface" that is represented to help prevent mirror-like glare of sunlight. Anderson '827 teaches the pressing of a wire screen into the fiberboard to form a screen pattern into its wood fibers. Wire screen pressing is a time consuming and expensive step, and limits the manufacture of the silhouette to specific fiberboard materials, which can fail to stand up to the weathering demands required of decoys. Additionally, as taught by Anderson '827, the roughened fiberboard only provides an adequate substrate for black paint or white paint. A roughened, weatherproof goose silhouette decoy is needed that includes a more realistic color image of a goose.

Like Anderson '827, U.S. Pat. No. 5,293,703 to Cripe also includes measures intended to reduce flashing in silhouette decoys. Cripe '703 discloses a flat, plastic decoy with a photographic image applied beneath a low reflectivity topcoat. Cripe '703 employs a conventional four color printing process to achieve the photographic image. For the topcoat, Cripe '703 specifies a transparent UV ink that includes "amorphous transparent furned silica particles." Cripe '703 reports that a low reflectivity of 2% to 4% at a light incident angle of 60° can be achieved with his photographic decoy printing process. However, the standard 60° test angle is not a reliable indicator for other angles of incident light, nor can low reflectivity at any single angle be considered a guarantee that other angles of incident light, especially sunlight, will also have low reflectance. In practice, the Cripe '703 decoy fails to adequately reduce flashing at all angles of incident sunlight. A color, photo-reproduced goose decoy is needed that better reduces flashing in sunlight, especially as compared to Tryon '798 and Cripe '703.

SUMMARY OF INVENTION

The invention provides a process and apparatus for an animal decoy. The animal decoy includes a body with a body surface. An image substrate is applied to the body surface, and the image substrate includes a fabric material. A decoy image is printed upon the image substrate. The animal decoy includes a photo-reproduced image. The image is based upon a photograph of an actual animal. The image substrate can include a bonding surface. The bonding surface adheres to the body surface. The first substrate includes an outer surface that can includes a bonding surface that can include an elastomeric coating, for adhereing to the decoy body.

The process of the invention includes an initial step of cutting a silhouette body from a substantially rigid material. A fabric substrate is laminated to the silhouette body, and finally, an image is applied to the fabric substrate. The initial cutting of the silhouette body can be a rough cut or several images can be applied to a single sheet before finish cutting the silhouette body to a silhouette final form.

According to one aspect of the invention, the decoy image is applied to a fabric substrate that minimizes the sunlight flashing of the decoy.

According to another aspect of the invention, an extremely low-glare and weatherproof silhouette decoy is provided that includes a realistic color image, which is especially effective for a goose decoy image.

The invention has the advantage of providing a permanently bonded, non-glare surface for a silhouette decoy that can receive a printed decoy image thereon.

DETAILED DESCRIPTION OF SPECIFIC EMBODIMENTS

Figure 1:
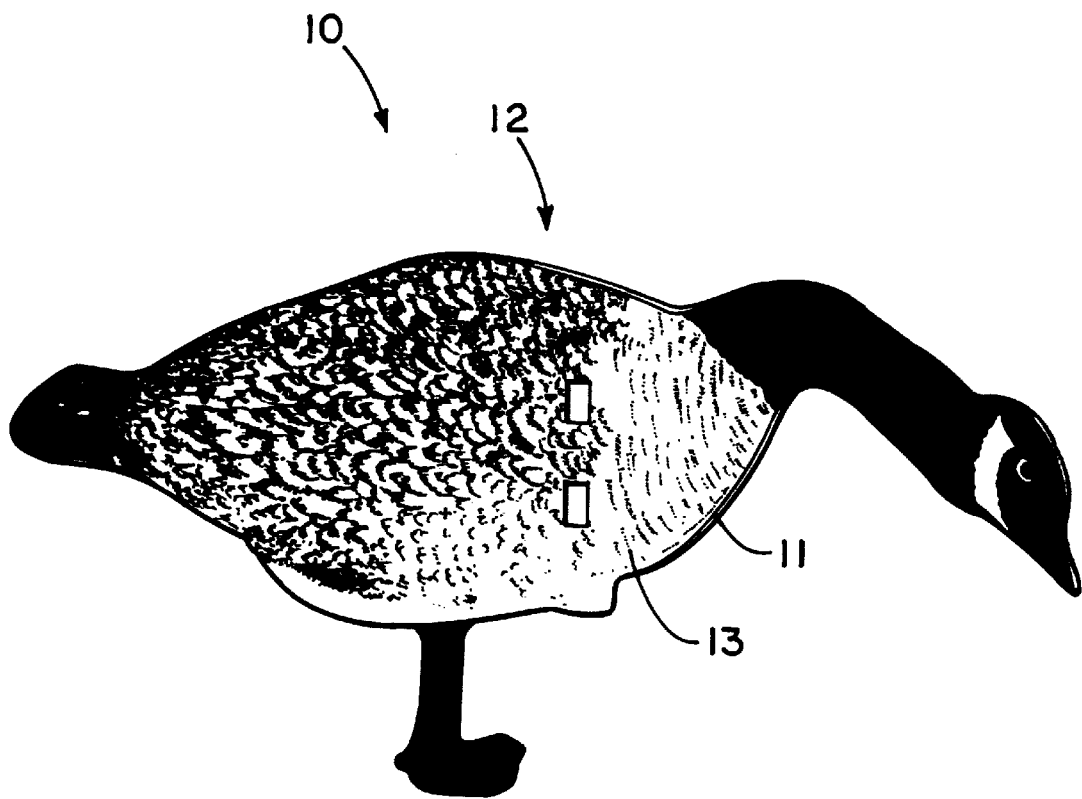
FIG. 1 is a perspective diagram of a photo reproduced goose decoy, according to an embodiment of this invention.
Figure 2:
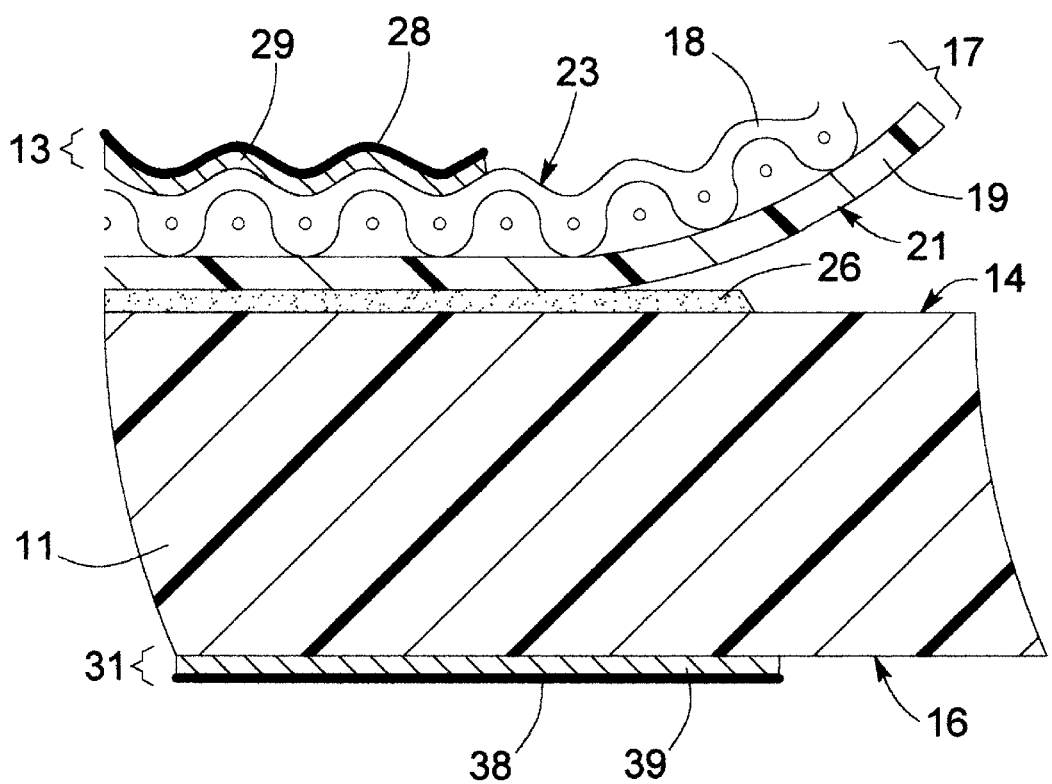
FIG. 2 is a typical cross sectional diagram of a decoy having a photo-reproduced image thereon, according to an embodiment of this invention.

The invention provides a decoy having a decoy image printed thereon. A preferred embodiment of the decoy 10 is shown in FIGS. 1 and 2, and includes a body 11. The body is preferably formed in the shape of a silhouette 12 cut from a flat sheet of acrylonitrile-butadiene-styrene copolymer (ABS plastic), as shown in FIG. 1. ABS plastic is a weather proof and light weight material that provides a sturdy body, easily cut to form a silhouette. The body receives the decoy image to match the silhouette. FIG. 1 shows a first decoy image printed on the body. FIG. 2 shows a typical cross section of the decoy and details the decoy body as a central component of the decoy.

A wide variety of animal silhouette shapes and images can be employed for the present invention. Not only can a variety of species be depicted in the silhouette 12 and the decoy image 13, but also a large number of poses or positions can be depicted of any single species, such as feeding, sleeping or as an alert sentry. Other variations may include male, female, seasonal colorations, adult and immature animals of any particular species. The present invention is primarily directed toward waterfowl silhouettes, and more specifically goose silhouette decoys. The most desirable decoy for the species depicted by the present invention is the Canadian goose. The Canadian or Canada goose, ranks as North America's most abundant variety of wild goose. Therefore, the species selected for the silhouette and the decoy image of the decoy 10 shown in FIG. 1 and primarily discussed herein, is the Canadian goose. Decoys of other species of geese or waterfowl, as well as other species of birds or animals can also be manufactured by employing the present invention.

As discussed above, the body 11 of the decoy 10 is preferably formed from a two sided, flat sheet. In a preferred embodiment, as shown in FIG. 2, the body of the decoy has a first body surface 14 with a second body surface 16 opposed to the first body surface. Alternatively, to render the decoy in a three-dimensional form, the body could be made from a curved, molded, hollow or solid block of material, preferably of a plastic or similar material. In this three dimensional embodiment, the first surface could be any contiguous surface of the body. This contiguous surface could be curved or flat. However, the present invention is preferably embodied in a flat, two-sided animal decoy, and again, most preferably a goose silhouette decoy.

To receive a decoy image that imparts the decoy with the desired optical finish, a first image substrate 17 is applied, or laminated, to the first body surface. As shown in FIG. 2, the first image substrate is a woven fabric material 18, and most preferably a coarsely woven fabric material, such as a canvas.

Preferably, as also shown in FIG. 2, the first image substrate 17 includes a bonding layer 19 for adhering to the decoy body 11. The bonding layer is preferably an elastomeric coating, integrated into the woven fabric of the first image substrate. For the first image substrate, a conventional tent, awning or drapery canvas can be utilized. A 50/50 polyester-cotton blend is preferred. Most preferably, the canvas should be white. The white colored or bleached canvas is best suited to receive a photo-reproduced image, without the need for an additional white ink printing layer. For superior adhesion to the first body surface 14 of the decoy body 11, the canvas should additionally include an opaque, rubberized, blackout or weather coating. This rubberized coating is the bonding layer of the present invention.

The bonding layer 19 of the first image substrate 17 includes a bonding surface 21 that adheres to the decoy body 11. An adhesive 26 is applied to the first body surface 14 of the decoy body to adhere the bonding layer of the image substrate to the decoy body. Most preferably, the adhesive is a STAMARK™, series 9771 laminating adhesive, as manufactured by 3M of St. Paul, Minn., USA. With the preferred adhesive, the bonding surface adheres the first body surface of the decoy body to the bonding surface of the bonding layer with a tight and weather resistant bond, especially in cold, damp environments. This adhesion process step can also be referred to as a lamination. A conventional laminating machine, which applies the adhesive with heat to the decoy body and then presses the first image substrate to the body, is preferably employed.

The first image substrate 17 also includes an outer surface 23 for receiving the first decoy image 13, as shown in FIG. 2. The first decoy image can be any image selected and modified to be the most effective in attracting the desired animal species. The white canvas of the preferred first image substrate receives vinyl-based inks to form a realistic printed decoy image. Preferably, a flat finished, "ultra-violet light resistant" or UV ink is utilized. Mostly preferably, a flat vinyl screen ink, as manufactured by NAZDAR of Chicago, Ill., USA, and colors selected from the NAZDAR VF Series with a 5% SYLIOD additive as a flattening agent. The VF Series inks can be successfully utilized to provide an opaque decoy image having excellent weather and crack resistant properties with a flat or matte finish.

The first decoy image 13 is printed upon the first image substrate 17, preferably by a conventional screen printing process. Again, the initial color of the outer surface 23 of the first image substrate is preferably white, to provide a base color layer for the decoy image. Most preferably, a posterized two color process is employed, utilizing a first black layer 28 over a first sienna layer 29 that is applied to the outer surface. This posterization process drastically reduces printing costs as compared to a standard three or four color photographic printing process. Additionally, the posterized two color process is more forgiving to slight offsets in alignment of the individual printing alignment, which results in less waste and misprinted scrap.

To additionally minimize flashing, the first decoy image 13 is printed on the first image substrate 17. The second body surface 16 can be faced away from the sun, and so does not require a flash reducing substrate. Therefore, as shown in FIG. 2, a second decoy image 31 can be applied directly to the second body surface of the decoy body 11. Like the first decoy image, the second decoy image can include a second black layer 38 applied over a second sienna layer 39 that is applied to the second body surface. Preferably, the second body surface, like the outer surface 23 of the first image substrate, is white. Again, the white surface eliminates the need for a white printing coat for the second body surface.

In a preferred process of the present invention, the decoy body 11 remains in the form of an uncut sheet until after first image substrate 17 is applied to the sheet, the first decoy image 13 is printed on the first image substrate and a second decoy image 31 is printed on the second body surface 16. Most preferably, an automated die cutting machine is then employed to cut the silhouette 12 of the decoy body into its final form. By waiting to a later step to cut the decoy body into its final silhouette, the potential of damage to the decoy body during manufacture is minimized.

Also alternatively, several first decoy images can be printed on a large sheet of the decoy body 11 material. In this multiple printing, the decoys 10 can be nested together to further minimize scrap and waste material in the manufacturing of the decoy of the present invention. The silhouette 12 can be cut into its final, finished form after the laminating of the first image substrate and the printing of the first decoy image. The second decoy image can also be printed on the uncut decoy body sheet prior to the final cutting.

The first decoy image 13 and the second decoy image 31 of the present invention can be described as "photo reproduced," in that the images need not be exact photographic images of a goose, or other animal that the decoy is to represent. To illustrate this point, it is readily apparent to most sport fishermen that exaggerated colors and features are in many cases more effective in attracting fish than the subtle, subdued colors typically found in nature. Similarly, for birds, waterfowl and specifically for geese, the decoy image is more effective if certain colors and features of the decoy images and silhouette 12 are enhanced and altered. For instance, if the white portions of the decoy are brightened, incoming geese can better see the decoy from farther away. Additional enhancements can include a wider neck, brighter eyes and more substantial feet, as compared to these same features of an actual Canadian goose. The contrast of the feathers can also be enhanced to increase the distance at which the finer detail of the decoy images can be seen. A conventional film-rendered camera photograph can be the source of the decoy image. Alternatively, a digital camera or a still frame from a video camera can be utilized to generate a raw decoy image. The raw decoy image can be utilized as is, or modified, as suggested above, in a darkroom or on the computer for the desired effect in the final decoy image, In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the following claims, as appropriately interpreted in accordance with the doctrine of equivalents.

What is claimed is:

1. An animal decoy, comprising:

a body having a first body surface;

a first image substrate applied to the first body surface with an adhesive material, and the first image substrate includes a fabric material;

a first decoy image printed upon the first image substrate;

a second body surface, the first body surface opposed to the second body surface, the second body surface includes a second decoy image, and the first image substrate having a bonding layer, the bonding layer adherable to the decoy body with said adhesive material, the bonding layer formed of a coating applied to the fabric material.

2. The animal decoy of claim 1, wherein:

the second body surface includes a second image substrate, the second image substrate applied to the second body surface, and the second image substrate includes a fabric material; and the second decoy image is printed upon the second image substrate.

3. The animal decoy of claim 1, wherein the second decoy image is a photo reproduced image.

4. The animal decoy of claim 1, wherein the first decoy image is a photo reproduced image.

5. The animal decoy of claim 1, wherein the first image substrate is a coarsely woven fabric material.

6. The animal decoy of claim 1, wherein the first image substrate is a canvas material.

7. The animal decoy of claim 1, wherein:

the bonding layer comprises an elastomeric coating, the elastomeric coating for receiving the adhesive material.

8. An animal decoy, comprising:

a body having a first body surface;

a first image substrate applied to the first body surface with an adhesive material, and the first image substrate includes a fabric material;

a first decoy image printed upon the first image substrate, and the first image substrate having a bonding layer, the bonding layer adherable to the decoy body with said adhesive material, the bonding layer formed of a coating applied to the fabric material.

9. The animal decoy of claim 8 wherein:

the bonding layer comprises an elastomeric coating, the elastomeric coating for receiving the adhesive material.

10. The animal decoy of claim 8, wherein the first decoy image is a photo reproduced image.

11. The animal decoy of claim 8, wherein the first image substrate is a coarsely woven fabric material.

12. The animal decoy of claim 8, wherein the first image substrate is a canvas material.

* * * * *